United States Patent
Park et al.

(10) Patent No.: US 9,840,610 B2
(45) Date of Patent: Dec. 12, 2017

(54) THERMOPLASTIC RESIN COMPOSITION AND MOLDED ARTICLE USING THE SAME

(71) Applicant: Samsung SDI Co., Ltd., Yongin-si (KR)

(72) Inventors: Chan Moo Park, Uiwang-si (KR); Tae Gon Kang, Uiwang-si (KR); Yoo Jin Jung, Uiwang-si (KR); Jong Cheol Lim, Uiwang-si (KR); Sang Hyun Hong, Uiwang-si (KR)

(73) Assignee: Lotte Advanced Materials Co., Ltd., Yeosu-si (KR)

( * ) Notice: Subject to any disclaimer, the term of this patent is extended or adjusted under 35 U.S.C. 154(b) by 0 days.

(21) Appl. No.: 14/862,467

(22) Filed: Sep. 23, 2015

(65) Prior Publication Data

US 2016/0090470 A1    Mar. 31, 2016

(30) Foreign Application Priority Data

Sep. 30, 2014  (KR) .................. 10-2014-0131327
Aug. 21, 2015  (KR) .................. 10-2015-0118246

(51) Int. Cl.
   *C08K 9/06*   (2006.01)
   *C08K 3/00*   (2006.01)

(52) U.S. Cl.
   CPC .............. *C08K 9/06* (2013.01); *C08K 3/0033* (2013.01)

(58) Field of Classification Search
   CPC ....................................................... C08K 9/06
   See application file for complete search history.

(56) References Cited

U.S. PATENT DOCUMENTS

| | | | |
|---|---|---|---|
| 4,177,185 A | 12/1979 | Tacke et al. | |
| 4,185,044 A | 1/1980 | Tacke et al. | |
| 4,639,480 A | 1/1987 | Birum | |
| 4,990,549 A * | 2/1991 | Delvin ..................... | C08K 9/04 523/209 |
| 5,242,967 A | 9/1993 | Minnick | |
| 5,256,718 A | 10/1993 | Yamamoto et al. | |
| 5,529,716 A | 6/1996 | Nomura et al. | |
| 5,841,088 A | 11/1998 | Yamaguchi et al. | |
| 5,849,380 A | 12/1998 | Kashiba et al. | |
| 5,863,974 A | 1/1999 | Tjahjadi et al. | |
| 6,238,732 B1 | 5/2001 | Cameron et al. | |
| 6,277,905 B1 | 8/2001 | Keep | |
| 6,506,830 B1 | 1/2003 | Bussi et al. | |
| 7,009,029 B2 | 3/2006 | Oka et al. | |
| 8,178,608 B2 | 5/2012 | Nakamura et al. | |
| 8,304,481 B2 | 11/2012 | Nakamura et al. | |
| 8,426,549 B2 | 4/2013 | Ogasawara | |
| 8,815,993 B2 | 8/2014 | Kim et al. | |
| 8,933,158 B2 | 1/2015 | Shiobara et al. | |
| 9,062,198 B2 | 6/2015 | Lu | |
| 9,187,621 B2 | 11/2015 | Lu | |
| 9,437,790 B2 | 9/2016 | Kim et al. | |
| 2004/0102604 A1 | 5/2004 | Bassler et al. | |
| 2004/0175466 A1 | 9/2004 | Douglas et al. | |
| 2005/0113532 A1 | 5/2005 | Fish, Jr. et al. | |
| 2007/0213458 A1* | 9/2007 | Topoulos ............... | C08K 5/005 524/601 |
| 2008/0146718 A1 | 6/2008 | Gijsman et al. | |
| 2009/0069479 A1 | 3/2009 | Seki | |
| 2009/0253847 A1 | 10/2009 | Komatsu et al. | |
| 2010/0113656 A1 | 5/2010 | Saga | |
| 2010/0227957 A1 | 9/2010 | Fujii | |
| 2011/0310622 A1 | 12/2011 | Topoulos | |
| 2012/0165448 A1 | 6/2012 | Lee et al. | |
| 2012/0305287 A1 | 12/2012 | Ni | |
| 2012/0329938 A1 | 12/2012 | Kim et al. | |
| 2013/0005875 A1 | 1/2013 | Shoji et al. | |
| 2013/0158184 A1 | 6/2013 | Topoulos | |
| 2013/0172453 A1 | 7/2013 | Lee et al. | |
| 2013/0217830 A1 | 8/2013 | Crawford et al. | |
| 2013/0281587 A1 | 10/2013 | Shim et al. | |
| 2014/0167088 A1 | 6/2014 | Lu | |
| 2014/0167091 A1 | 6/2014 | Ogasawara et al. | |
| 2014/0187662 A1 | 7/2014 | Lee et al. | |
| 2014/0187700 A1 | 7/2014 | Lee et al. | |
| 2014/0309356 A1 | 10/2014 | Kim et al. | |
| 2014/0350163 A1 | 11/2014 | Kim et al. | |

FOREIGN PATENT DOCUMENTS

| | | |
|---|---|---|
| CN | 1376182 A | 10/2002 |
| CN | 101550282 A | 10/2009 |
| CN | 101560325 A | 10/2009 |
| CN | 102838849 A | 12/2012 |
| CN | 103270114 A | 8/2013 |

(Continued)

OTHER PUBLICATIONS

Office Action in counterpart Taiwanese Application No. 104132047 dated Jun. 4, 2016, pp. 1-7.
Office Action in commonly owned U.S. Appl. No. 14/552,765 dated May 10, 2017, pp. 1-8.
Full Translation of Higuchi et al. JP 2007-218980, pp. 1-32.
Office Action in commonly owned U.S. Appl. No. 13/728,177 dated Oct. 23, 2013, pp. 1-7.
Office Action in commonly owned U.S. Appl. No. 13/728,177 dated Feb. 10, 2014, pp. 1-13.
Office Action in commonly owned U.S. Appl. No. 13/332,788 dated Nov. 28, 2012, pp. 1-8.
Final Office Action in commonly owned U.S. Appl. No. 13/332,788 dated Jul. 25, 2013, pp. 1-12.
Office Action in commonly owned U.S. Appl. No. 14/067,139 dated May 22, 2014, pp. 1-8.
International Search Report in commonly owned International Application No. PCT/KR2011/006328 dated Apr. 4, 2012, pp. 1-4.
Office Action in commonly owned U.S. Appl. No. 13/915,655 dated Mar. 5, 2014, pp. 1-7.

(Continued)

*Primary Examiner* — Michael Pepitone
(74) *Attorney, Agent, or Firm* — Additon, Higgins & Pendleton, P.A.

(57) ABSTRACT

A thermoplastic resin composition includes (A) a polyester resin, (B) inorganic fillers, and (C) a white pigment, wherein at least one of the (B) inorganic fillers and the (C) white pigment is subjected to surface treatment with a silicone compound, and silicon is present in an amount of about 0.3 wt % to about 2 wt % based on the total weight of (A), (B), and (C).

9 Claims, 1 Drawing Sheet

(56) References Cited

FOREIGN PATENT DOCUMENTS

| | | | |
|---|---|---|---|
| CN | 103910979 A | 7/2014 |
| CN | 103911000 A | 7/2014 |
| DE | 10 2013 226 703 A1 | 7/2014 |
| JP | 1994-200132 | 7/1994 |
| JP | 1995-228776 | 8/1995 |
| JP | 2000-204244 A | 7/2000 |
| JP | 2002-294070 A | 10/2002 |
| JP | 2004-075994 A | 3/2004 |
| JP | 4325753 | 12/2004 |
| JP | 4915155 | 12/2004 |
| JP | 2007-218980 | 8/2007 |
| JP | 2009-507990 A | 2/2009 |
| JP | 2014-148615 A | 8/2014 |
| KR | 10-2007-0093994 A | 9/2007 |
| KR | 2007-7026437 A | 12/2007 |
| KR | 10-2012-0066740 A | 6/2012 |
| KR | 10-2012-0140332 A | 12/2012 |
| KR | 2013-0076733 A | 7/2013 |
| KR | 10-2013-0116813 A | 10/2013 |
| KR | 10-2014-0075517 A | 6/2014 |
| TW | 201306319 A | 2/2013 |
| TW | 201343743 A | 11/2013 |
| TW | 201343777 A | 11/2013 |
| WO | 03/085029 A1 | 10/2003 |
| WO | 2012/081801 A1 | 6/2012 |
| WO | 2013/101277 A1 | 7/2013 |
| WO | 2013/129201 A1 | 9/2013 |

OTHER PUBLICATIONS

Notice of Allowance in commonly owned U.S. Appl. No. 13/728,177 dated May 30, 2014, pp. 1-5.
Final Office Action in commonly owned U.S. Appl. No. 13/915,655 dated Jun. 23, 2014, pp. 1-5.
Notice of Allowance in commonly owned U.S. Appl. No. 13/915,655 dated Oct. 15, 2014, pp. 1-7.
Office Action in commonly owned Korean Application No. 10-2014-0182421 dated Jan. 26, 2017, pp. 1-5.
Wypych, "2.1.67 Wollastonite," Handbook of Fillers, 3d Ed., pp. 151-152, Toronto, Ontario: ChemTec Publishing (2010).
Office Action in commonly owned Korean Application No. 10-2014-0138130 dated Nov. 16, 2016, pp. 1-5.
Office Action in commonly owned U.S. Appl. No. 14/971,348 dated Apr. 14, 2017, pp. 1-15.
Office Action in commonly owned Chinese Application No. 201510359435.X dated Jun. 17, 2016, pp. 1-7.
Office Action in commonly owned U.S. Appl. No. 14/044,906 dated Sep. 15, 2014, pp. 1-6.
Notice of Allowance in commonly owned U.S. Appl. No. 14/044,906 dated Dec. 29, 2014, pp. 1-6.
Office Action in commonly owned U.S. Appl. No. 13/332,736 dated Sep. 17, 2013, pp. 1-7.
Notice of Allowance in commonly owned U.S. Appl. No. 13/332,736 dated Apr. 17, 2014, pp. 1-8.
Office Action in commonly owned U.S. Appl. No. 14/102,535 dated Sep. 26, 2014, pp. 1-8.
Office Action in commonly owned U.S. Appl. No. 14/522,765 dated Sep. 26, 2016, pp. 1-8.
Office Action in counterpart Chinese Application No. 201510633614.8 dated Dec. 12, 2016, pp. 1-7.
Office Action in commonly owned German Application No. 102014224495.1 dated Feb. 15, 2017, pp. 1-8.
Office Action in commonly owned U.S. Appl. No. 14/748,879 dated May 25, 2017, pp. 1-15.
Office Action in commonly owned Korean Application No. 10-2015-0093747 dated Apr. 14, 2017, pp. 1-6.
Office Action in commonly owned U.S. Appl. No. 15/195,128 dated Jun. 14, 2017, pp. 1-111.
Turner et al., "Cyclohexanedimethanol Polyesters", 2001, pp. 127-134.
Office Action in commonly owned Chinese Application No. 20150946837.X dated Mar. 3, 2017, pp. 1-10.
Office Actin in commonly owned Chinese Patent Applicatin No. 201610520653.1 dated May 19, 2017, pp. 1-7.
Office Action in commonly owned Korean Application No. 10-2015-0078825 dated Mar. 29, 2017, pp. 1-6.

* cited by examiner

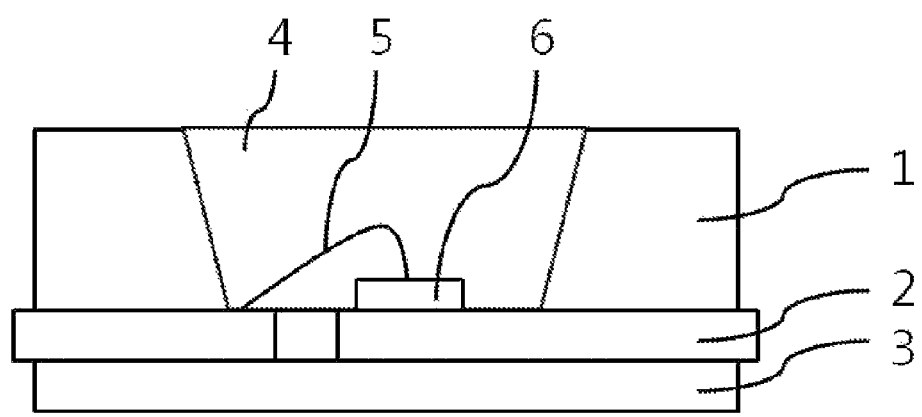

THERMOPLASTIC RESIN COMPOSITION AND MOLDED ARTICLE USING THE SAME

CROSS-REFERENCE TO RELATED APPLICATION

This application claims priority to and the benefit of Korean Patent Application No. 10-2014-013127, filed on Sep. 30, 2014 and Korean Patent Application No. 10-2015-0118246, filed on Aug. 21, 2015, in the Korean Intellectual Property Office, the entire disclosure of each of which is incorporated herein by reference.

FIELD

The present invention relates to a thermoplastic resin composition and a molded article formed using the same.

BACKGROUND

An optical semiconductor device is a device that converts electric energy into light energy, and includes, for example, a light emitting diode (LED). An LED can emit light at various wavelengths depending on light emitting materials, and includes, for example, organic LEDs, inorganic LEDs, quantum dot LEDs, and the like. Such an LED has advantages such as high photo-conversion efficiency, low energy consumption, long lifespan, and environmental friendliness, and thus is used as a light source of an illumination device.

Examples of an illumination device using an LED as a light source include a light source including a diode, a package, a panel, and a module, and also include a component including a reflector, a housing, a light guide plate, and a light diffusion plate to increase photo-availability. A material for the component is required to exhibit high reflectance, heat resistance, and discoloration resistance.

Recently, as such a material for the component, a polyester resin having excellent deformation resistance and discoloration resistance at high temperature has been used. There remains a need, however, for a technique capable of improving mechanical strength, heat resistance, moldability, and reflectance of a polyester thermoplastic resin, which is used as a material for components of an LED illumination device.

SUMMARY OF THE INVENTION

The present invention provides a thermoplastic resin composition capable of realizing excellent whiteness, high reflectance, excellent reflectance maintenance, photostability, heat resistance and discoloration resistance, and a molded article manufactured using the same.

The thermoplastic resin composition includes: (A) a polyester resin; (B) inorganic fillers; and (C) a white pigment, wherein at least one of the (B) inorganic fillers and the (C) white pigment is subjected to surface treatment with a silicone compound, and silicon is present in an amount of about 0.3 wt % to about 2 wt % based on the total weight of (A), (B), and (C).

A molded article is manufactured using the thermoplastic resin composition as set forth above.

The molded article can be a component of an illumination device including a LED(s) as a light source, and the component may include a reflector and/or a housing.

Embodiments of the present invention provide a thermoplastic resin composition which can secure high reflectance and excellent whiteness and maintain high reflectance over a long period of time, thereby realizing excellent properties in terms of photostability, constant temperature/humidity reliability, heat resistance, and discoloration resistance. Embodiments of the present invention also provide a molded article manufactured using the same.

BRIEF DESCRIPTION OF DRAWINGS

FIG. 1 is a sectional view of an LED illumination device employing a molded article according to one embodiment of the present invention.

DETAILED DESCRIPTION

Hereinafter, embodiments of the present invention will be described in detail in the following detailed description in which some, but not all, embodiments are described. Indeed, this invention may be embodied in many different forms and should not be construed as limited to the embodiments set forth herein; rather, these embodiments are provided so that this disclosure will satisfy applicable legal requirements. It should be understood that the following embodiments are provided for complete disclosure and thorough understanding of the invention by those skilled in the art. In addition, unless otherwise stated, technical and scientific terms as used herein have a meaning generally understood by those skilled in the art. Descriptions of known functions and constructions which can unnecessarily obscure the subject matter of the invention will be omitted.

In accordance with exemplary embodiments, a thermoplastic resin composition includes: (A) a polyester resin; (B) inorganic fillers; and (C) a white pigment, wherein at least one of the (B) inorganic fillers and the (C) white pigment (which is not the same as the inorganic fillers) is subjected to surface treatment with a silicone compound, and silicon is present in an amount of about 0.3 wt % to about 2 wt % based on the total weight (100 wt %) of (A), (B), and (C). Accordingly, the thermoplastic resin according to the present invention includes inorganic fillers subjected to surface treatment with a silicone compound and/or a white pigment subjected to surface treatment with a silicone compound, and thus can have improved interfacial properties and compatibility with a matrix resin, thereby realizing excellent reflectance and reflectance maintenance while providing excellent discoloration resistance, whiteness, heat resistance, photostability, and constant temperature/humidity reliability.

Hereinafter, each of the above components will be described in more detail.

(A) Polyester Resin

The polyester resin may be included in the thermoplastic resin composition to enhance heat resistance, mechanical properties, and impact resistance of a molded article at high temperature.

The polyester resin may be a polyester compound which includes an aromatic ring in a repeat unit. In this case, a molded article can have excellent heat resistance and discoloration resistance. The polyester resin may be prepared by polycondensation of a dicarboxylic acid component including an aromatic dicarboxylic acid and/or a derivative thereof with a $C_2$ to $C_{20}$ diol component.

The aromatic dicarboxylic acid component may include, for example, terephthalic acid, isophthalic acid, phthalic acid, and naphthalene dicarboxylic acid. These may be used alone or in combination thereof. In exemplary embodiments, the dicarboxylic acid component may include terephthalic acid. In this case, the polyester resin can have excellent stability, and a molded article manufactured using the same can have further enhanced discoloration resistance.

The diol component may include an alicyclic diol; or a mixture of an alicyclic diol and a non-alicyclic diol without being limited thereto. In this case, the polyester resin may include an alicyclic structure and an aromatic ring originating from the dicarboxylic acid component in a repeat unit. As a result, the polyester resin can have a low melting point, and a molded article manufactured using the same can have enhanced moldability.

Examples of the alicyclic diol may include without limitation 1,4-cyclohexanedimethanol, 1,2-cyclohexanedimethanol, 1,3-cyclohexanedimethanol, cis-1,4-cyclohexanedimethanol, cis-1,2-cyclohexanedimethanol, and cis-1,3-cyclohexanedimethanol. These may be used alone or in combination thereof. In exemplary embodiments, the alicyclic diol may include 1,4-cyclohexanedimethanol (CHDM). In this case, a molded article manufactured using the polyester resin can exhibit further enhanced moldability and photostability.

The non-alicyclic diol may be an aliphatic diol without an alicyclic ring. Examples of the aliphatic diol may include without limitation ethylene glycol, butylene glycol, and propylene glycol. These may be used alone or in combination thereof. In exemplary embodiments, the aliphatic diol may include ethylene glycol. In this case, a molded article manufactured using the polyester resin can exhibit excellent heat resistance and further enhanced impact resistance.

The diol component may include the alicyclic diol in an amount of about 15 wt % to 100 wt %, and the aliphatic diol described above in an amount of 0 wt % to about 85 wt % based on the total weight (100 wt %) of the diol component.

In some embodiments, the diol component may include the alicyclic diol in an amount of about 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100 wt %. Further, according to some embodiments of the present invention, the alicyclic diol may be present in an amount of from about any of the foregoing amounts to about any other of the foregoing amounts.

In some embodiments, the diol component may include the aliphatic diol in an amount of 0 (the aliphatic diol is not present), about 0 (the aliphatic diol is present), 1, 2, 3, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, or 85 wt %. Further, according to some embodiments of the present invention, the aliphatic diol may be present in an amount of from about any of the foregoing amounts to about any other of the foregoing amounts.

In exemplary embodiments, the diol component may include about 30 wt % to about 80 wt % of 1,4-cyclohexanedimethanol and about 20 wt % to about 70 wt % of ethylene glycol.

In some embodiments, the diol component may include 1,4-cyclohexanedimethanol in an amount of about 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80 wt %. Further, according to some embodiments of the present invention, 1,4-cyclohexanedimethanol may be present in an amount of from about any of the foregoing amounts to about any other of the foregoing amounts.

In some embodiments, the diol component may include ethylene glycol in an amount of about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, or 70 wt %. Further, according to some embodiments of the present invention, ethylene glycol may be present in an amount of from about any of the foregoing amounts to about any other of the foregoing amounts.

In this case, the diol component can further improve heat resistance and impact resistance of the polyester resin.

The polyester resin may further include polyester resin modified with at least one $C_6$ to $C_{21}$ aromatic diol, at least one $C_3$ to $C_8$ aliphatic diol and/or at least one $C_3$ to $C_{10}$ alicyclic diol. In exemplary embodiments, the $C_6$ to $C_{21}$ aromatic diol, the $C_3$ to $C_8$ aliphatic diol and/or at least one $C_3$ to $C_{10}$ alicyclic diol may be copolymerized with the polyester resin for modify the polyester resin. The $C_6$ to $C_{21}$ aromatic diol, the $C_3$ to $C_8$ aliphatic diol and/or at least one $C_3$ to $C_{10}$ alicyclic diol may be present in an amount of about 3 mole % or less based on 100 mol % of the diol component. Examples of the $C_6$ to $C_{21}$ aromatic diol may include without limitation 2,2-bis-(3-hydroxyethoxyphenyl)-propane, 2,2-bis-(4-hydroxypropoxyphenyl)-propane, and the like, and mixtures thereof. Examples of the $C_3$ to $C_8$ aliphatic diol may include without limitation propane-1,3-diol, butane-1,4-diol, pentane-1,5-diol, hexane-1,6-diol, 3-methylpentane-2,4-diol, 2-methylpentane-1,4-diol, 2,2,4-trimethylpentane-1,3-diol, 2-ethylhexane-1,3-diol and 2,2-diethylpropane-1,3-diol, and the like, and mixtures thereof. Examples of the $C_3$ to $C_{10}$ alicyclic diol may include without limitation 1,4-cyclobutanedimethanol, and the like, and mixtures thereof.

The polyester resin may be prepared by a polycondensation method known in the art. For example, the polycondensation method may include direct condensation of an acid through transesterification using a glycol or a lower alkyl ester, without being limited thereto.

Examples of the polyester resin may include without limitation a polyethylene terephthalate resin, a polytrimethylene terephthalate resin, a polybutylene terephthalate resin, a polyhexamethylene terephthalate resin, a polycyclohexane dimethylene terephthalate resin, an amorphous modified polyester resin thereof, and the like. These may be used alone or as a mixture thereof.

For example, the polyester resin may be a polycyclohexane dimethylene terephthalate (PCT) resin including a unit represented by Formula 1:

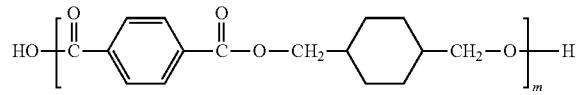

where m is an integer from 10 to 500.

In this case, a molded article manufactured using the polyester resin can have high reflectance and exhibit further enhanced reflectance maintenance (photostability), constant temperature and humidity reliability, and discoloration resistance. The unit represented by Formula 1 may be, for example, a resin prepared by polycondensation of terephthalic acid and 1,4-cyclohexanedimethanol.

The polyester resin may have a melting point of about 200° C. or higher, for example about 200° C. to about 380°

C., as another example about 220° C. to about 380° C., as and as another example about 260° C. to about 320° C. or about 200° C. to about 300° C.

The polyester resin may have an intrinsic viscosity [ii] (measured in a viscosity tube at 35° C. using a solution in which tetrachloroethane and phenol are mixed in a weight ratio of 1:1) of about 0.4 dl/g to about 1.5 dl/g, for example about 0.5 dl/g to about 1.2 dl/g, as measured at about 25° C. using an o-chlorophenol solution. Within this range, a molded article can exhibit enhanced moldability and mechanical properties.

The polyester resin may have a weight average molecular weight of, for example, about 3,000 g/mol to about 30,000 g/mol, and as another example about 5,000 g/mol to about 20,000 g/mol. Within this range, a molded article can exhibit enhanced moldability and mechanical properties.

As used herein, weight average molecular weight is measured by Gel Permeation Chromatography (GPC); Lient Technologies 1200 series) after dissolving a powder specimen in tetrahydrofuran (THF) (column: Shodex LF-804 (8.0.1.D.×300 mm), standard specimen: polystyrene (Shodex Co., Ltd.)).

The thermoplastic resin composition may include the polyester resin in an amount of about 50 wt % to about 80 wt % based on the total weight (100 wt %) of the thermoplastic resin composition. For example, the polyester resin may be present in an amount of about 60 wt % to about 70 wt % based on the total weight of the thermoplastic resin composition. In some embodiments, the thermoplastic resin composition may include the polyester resin in an amount of about 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80 wt %. Further, according to some embodiments of the present invention, the polyester resin may be present in an amount of from about any of the foregoing amounts to about any other of the foregoing amounts.

Within this range, a molded article can have excellent heat resistance and mechanical properties while exhibiting excellent moldability and photostability.

(B) Inorganic Filler

In the thermoplastic composition, the inorganic fillers can enhance strength of the thermoplastic composition through combination with other components, and can provide high reflectance to a molded article and realize excellent photostability and discoloration resistance.

Examples of the inorganic fillers may include without limitation carbon fillers, glass fillers, metal fillers, metalloid fillers, clay, kaolin, talc, mica, wollastonite, and the like, and mixtures thereof.

Examples of the carbon fillers may include without limitation carbon fiber, graphite, carbon black, and the like, and mixtures thereof.

Examples of the glass fillers may include without limitation fiberglass, glass beads, glass flakes, and the like, and mixtures thereof.

Examples of the metal fillers may include without limitation potassium titanate whisker, aluminum borate whisker, calcium whisker, and the like, and mixtures thereof.

Examples of the metalloid fillers may include without limitation boron fibers and the like.

In exemplary embodiments, the inorganic fillers may include glass fibers. The glass fibers may have a cross-section of a circular shape, elliptical shape, rectangular shape, and/or a dumbbell shape in which two circles are connected to each other. The glass fibers having a cross-section of a circular shape may have a diameter of 5 μm to about 20 μm and a length before processing of 2 mm to about 5 mm. In addition, the glass fibers having a cross-section of an elliptical shape may have an aspect ratio of about 1.5 to about 10 and a length before processing of 2 mm to about 5 mm. In this case, the thermoplastic resin composition can have enhanced processability and further improve mechanical properties, such as tensile strength and impact resistance, of a molded article.

The inorganic fillers may be subjected to surface treatment with a silicone compound. As a result, the inorganic fillers can have increased coupling force to other components in the composition, thereby improving all relevant properties.

The silicone compound may include at least one compound represented by any one of Formula 2 and/or Formula 3:

$$R^1{}_x Si(R^2)_{4-x}$$ [Formula 2]

wherein each $R^1$ is the same or different and each is independently a $C_1$ to $C_5$ alkoxy group, each $R^2$ is the same or different and each is independently an acrylate group, a methacrylate group, a vinyl group, a $C_1$ to $C_{10}$ alkylamino group, a cyanate group, an isocyanate group, an epoxy group, a hydroxyl group, a thiol group, a ureido group, a $C_1$ to $C_{10}$ glycidyloxyalkyl group, a $C_3$ to $C_{10}$ epoxycycloalkyl group, or a carboxyl group, and x is an integer from 1 to 3.

Examples of the silicone compound represented by Formula 2 may include organic silane compound such as without limitation γ-(3,4-epoxycyclohexyl)ethyltrimethoxysilane, γ-glycidoxypropyltrimethoxysilane, γ-glycidoxypropylmethylethoxysilane, 2-(3,4-epoxycyclohexyl)ethyltriethoxysilane, γ-isocyanatopropyltrimethoxysilane, vinyltriethoxysilane, 2-aminopropyltriethoxysilane, and the like. The silicone compounds represented by Formula 2 may be used alone or as a mixture thereof. The silicone compound represented by Formula 2 may be coated onto the inorganic fillers, followed by curing with heat, catalyst, and/or UV light, thereby forming a coating layer, and is not particularly limited so long as the organic silane compound can be coated onto the inorganic fillers.

$$R^3{}_n(SiO_{(4-n)/2})_m$$ [Formula 3]

wherein each $R^3$ is the same or different and each is independently hydrogen, an unsubstituted $C_1$ to $C_{10}$ alkyl group, a vinyl-substituted $C_1$ to $C_{10}$ alkyl group, a $C_6$ to $C_{20}$ aryl-substituted $C_1$ to $C_{10}$ alkyl group, a vinyl group, a $C_6$ to $C_{20}$ aryl group, a $C_1$ to $C_{10}$ alkoxy group, a $C_1$ to $C_{10}$ alkyl-substituted $C_1$ to $C_{10}$ alkoxy group, a $C_1$ to $C_{10}$ alkoxy-substituted $C_7$ to $C_{20}$ alkaryl group, a halogen group, an acetoxy group, or a hydroxyl group, n ranges from 2 to 3, and m ranges from 2 to 200.

Examples of the silicone compound represented by Formula 3 may include organic siloxane compound such as without limitation polydimethylsiloxane, vinylphenylmethyl-terminated dimethylsiloxane, divinylmethyl-terminated polydimethylsiloxane, and the like. The silicone compound represented by Formula 3 may be used alone or as a mixture thereof. The silicone compound represented by Formula 3 is not particularly limited so long as the silicone compound can be coated onto the inorganic fillers.

When the thermoplastic resin composition includes inorganic fillers subjected to surface treatment with the silicone compound, silicon may be present in the inorganic fillers in an amount of about 0.2 wt % to about 17wt %, for example about 0.3 wt % to about 10 wt %, and as another example about 0.4 wt % to about 1.0 wt %, based on the total weight (100 wt %) of the inorganic fillers. In some embodiments, the inorganic fillers may include silicon in an amount of about 0.2, 0.3, 0.4, 0.5, 0.6, 0.7, 0.8, 0.9, 1, 2, 3, 4, 5, 6, 7, 8, 9, 10, 11, 12, 13, 14, 15, 16, or 17 wt %. Further, according to some embodiments of the present invention, silicon may be present in an amount of from about any of the foregoing amounts to about any other of the foregoing amounts.

The amount of silicon may be measured using a typical element analyzer, and has a meaning as defined above throughout the specification.

In addition, the thermoplastic resin composition may include silicon in an amount of about 0.3 wt % to about 2 wt %, for example, about 0.4 wt % to about 1.0 wt %, based on the total weight (100 wt %) of (A), (B), and (C). In some embodiments, the thermoplastic resin composition may include silicon in an amount of about 0.3, 0.4, 0.5, 0.6, 0.7, 0.8, 0.9, 1, or 2 wt %. Further, according to some embodiments of the present invention, silicon may be present in an amount of from about any of the foregoing amounts to about any other of the foregoing amounts. Within this range, the silicone compound can provide intended effects of the present invention.

The thermoplastic resin composition may include the inorganic fillers in an amount of about 5 wt % to about 30 wt %, for example about 10 wt % to about 25 wt %, based on the total weight (100 wt %) of the thermoplastic resin composition. In some embodiments, the thermoplastic resin composition may include the inorganic fillers in an amount of about 5, 6, 7, 8, 9, 10, 11, 12, 13, 14, 15, 16, 17, 18, 19, 20, 21, 22, 23, 24, 25, 26, 27, 28, 29, or 30 wt %. Further, according to some embodiments of the present invention, the inorganic fillers may be present in an amount of from about any of the foregoing amounts to about any other of the foregoing amounts.

Within this range, a molded article can exhibit further enhanced mechanical properties and discoloration resistance and can have excellent flowability and moldability while exhibiting enhanced photostability and optical efficiency.

(C) White Pigment

The white pigment is included in the thermoplastic resin composition to increase white pigment and enhance discoloration resistance. The white pigment is not the same as the inorganic filler. The white pigment may include any typical white pigments without limitation. Examples of the white pigment may include without limitation titanium oxide, zinc oxide, zinc sulfide, white lead, zinc sulfate, barium sulfate, calcium carbonate, alumina, and the like, and mixtures thereof. In exemplary embodiments, the white pigment may include titanium oxide. Although titanium oxide can have any crystal structure without limitation, the titanium oxide can have a rutile or anatase crystal structure, which can be stable upon exposure to high temperature for a long time and can effectively prevent deterioration in reflectance of the composition.

The white pigment may be subjected to surface treatment with a silicone compound. As a result, the white pigment can enhance mechanical properties such as strength as well as properties such as photostability and discoloration resistance through combination with other components.

When the composition includes the white pigment subjected to surface treatment with a silicone compound, the inorganic fillers may be subjected to surface treatment with a silicone compound or may not be subjected to surface treatment.

When at least one of the white pigment and the inorganic fillers in the thermoplastic resin composition is subjected to surface treatment with a silicone compound, it is possible to further enhance all relevant properties.

Again, the thermoplastic resin composition may include silicon in an amount of about 0.3 wt % to about 2 wt %, for example, about 0.4 wt % to about 1.0 wt %, based on the total weight (100 wt %) of (A), (B), and (C). In some embodiments, the thermoplastic resin composition may include silicon in an amount of about 0.3, 0.4, 0.5, 0.6, 0.7, 0.8, 0.9, 1, or 2 wt %. Further, according to some embodiments of the present invention, silicon may be present in an amount of from about any of the foregoing amounts to about any other of the foregoing amounts.

Within this range, it is possible to provide intended effects of the present invention.

In addition, the white pigment may include silicon in an amount of about 0.1 parts by weight to about 2 parts by weight based on about 100 parts by weight of the white pigment. In some embodiments, the white pigment may include silicon in an amount of about 0.1, 0.2, 0.3, 0.4, 0.5, 0.6, 0.7, 0.8, 0.9, 1, or 2 parts by weight. Further, according to some embodiments of the present invention, silicon may be present in an amount of from about any of the foregoing amounts to about any other of the foregoing amounts.

Examples of the silicone compound used in surface treatment of the white pigment are the same as that used in surface treatment of the inorganic fillers, and accordingly descriptions thereof will be omitted.

The white pigment may have an average particle diameter about 0.01 µm to about 2.0 µm, for example about 0.05 µm to about 0.7 µm.

The thermoplastic resin composition may include white pigment in an amount of about 5 wt % to about 30 wt %, for example about 10 wt % to about 25 wt %, based on the total weight (100 wt %) of the thermoplastic resin composition. In some embodiments, the thermoplastic resin composition may include the white pigment in an amount of about 5, 6, 7, 8, 9, 10, 11, 12, 13, 14, 15, 16, 17, 18, 19, 20, 21, 22, 23, 24, 25, 26, 27, 28, 29, or 30 wt %. Further, according to some embodiments of the present invention, the white pigment may be present in an amount of from about any of the foregoing amounts to about any other of the foregoing amounts.

Within this range, a molded article can exhibit excellent reflectance and reflectance maintenance while having further enhanced impact resistance and mechanical strength.

(D) Additive(s)

According to the present invention, the resin composition may further include one or more typical additives without affecting intended effects of the invention, as needed. Examples of the additives may include without limitation at least one of antibacterial agents, heat stabilizers, antioxidants, release agents, photo-stabilizers, surfactants, coupling agents, plasticizers, compatibilizers, lubricants, antistatic agents, flame retardants, flame retardant aids, anti-dripping agents, weather resistance stabilizers, UV absorbers, UV blocking agents, and the like, and mixtures thereof.

Examples of the antioxidants may include without limitation phenol based antioxidants, amine phenol based antioxidants, sulfur phenol based antioxidants, phosphorus based antioxidants, and the like, and mixtures thereof. Examples of the heat stabilizers may include without limitation lactone based heat stabilizers, hydroquinone based heat stabilizers, halogenated copper based heat stabilizers, iodine based heat stabilizers, and the like, and mixtures thereof. Examples of the flame retardants may include without limitation bromine based flame retardants, chlorine based flame retardants, phosphorus based flame retardants, antimony based flame retardants, and the like, and mixtures thereof.

The additives may be present in a proper amount without affecting properties of the polyester resin composition. For example, the additives may be present in an amount of about 20 parts by weight or less, as another example about 0.1 parts by weight to about 15 parts by weight, based on about 100 parts by weight of the composition.

The thermoplastic resin composition according to the present invention may be prepared by a method known in the art. For example, the above components and, optionally, other additives can be mixed using a Henschel mixer, a V blender, a tumbler blender, or a ribbon blender, followed by melt extrusion at about 150° C. to about 350° C. in a single screw extruder or a twin screw extruder, thereby preparing a resin composition in pellet form. The mixture of the components and the additive(s) can be subjected to extrusion under conditions of a temperature of about 250° C. to about 310° C., a screw rotating speed of about 300 rpm to about 600 rpm, and a self-feeding rate of about 60 kg/hr to about 600 kg/hr using a twin screw extruder with L/D of 29 and Φ of 36 mm, thereby preparing a polyester resin composition in pellet form. The prepared pellets can be dried at 80° C. for 4 hours or more and then injection molded into a specimen.

Other embodiments relate to a molded article which is formed of the thermoplastic resin composition and which can exhibit high reflectance and, particularly, excellent reflectance maintenance at high temperature while realizing discoloration resistance. For example, the molded article may be manufactured using the thermoplastic resin composition by a molding method known in the art, such as injection molding, dual injection molding, blow molding, extrusion, thermoforming, and the like.

The molded article may have a difference in reflectance of less than about 8%, as measured by Equation 1:

$$\text{Difference in reflectance (\%)} = |(F1-F0)|$$

where F0 is initial reflectance of the molded article, and F1 is reflectance measured after the molded article is irradiated with light at a wavelength of 450 nm in a constant temperature/humidity oven at 170° C. and 85% relative humidity (RH) for 480 hours.

For example, in some embodiments the molded article may have a difference in reflectance of about 7.8 or less, about 6.7 or less, about 6.5 or less, or about 6.4 or less.

The molded article may have a difference in yellow index of about 4.6 or less, as measured by Equation 2:

$$\text{Difference in yellow index (\%)} = |(YI1-YI0)|$$

where YI0 is initial yellow index of the molded article, and YI1 is yellow index measured after the molded article is left at 170° C. for 480 hours.

For example, in some embodiments the molded article may have a difference in yellow index of about 4.5 or less, or about 4.4 or less.

The molded article formed of the thermoplastic resin composition according to the present invention can exhibit high reflectance and excellent reflectance maintenance and discoloration resistance. For example, the molded article may be used as a component of illumination devices including LEDs. The component may be a reflector or housing for LEDs.

FIG. 1 is a sectional view of an exemplary illumination device (hereinafter referred to as "LED illumination device") including LEDs according to one embodiment of the present invention. Referring to FIG. 1, the LED illumination device includes: an LED package 2 including an LED photovoltaic device 6 and a lead 5 connected to an electrode surface of the photovoltaic device; a substrate 3 with the LED package fixed to one surface thereof; and a reflector 1 formed of the thermoplastic resin composition according to the invention and surrounding a light source of the photovoltaic device.

The thermoplastic resin composition may be used for a reflector 1 of an LED illumination device. In this case, the reflector 1 can exhibit excellent properties in terms of whiteness, reflectance, reflectance maintenance, constant temperature/humidity reliability, and heat resistance, and thus can enhance photo-availability of the LED illumination device while improving durability of the LED illumination device.

In addition, the molded article formed of the thermoplastic resin composition can be used for light reflection without limitation. For example, the molded article can be useful as a reflector for a light emitting device of electrical/electronic components, indoor/outdoor illumination devices, automotive lighting devices, displays, and the like.

EXAMPLES

Hereinafter, the present invention will be described in more detail with reference to the following examples. It should be understood that these examples are provided for illustration only and are not to be construed in any way as limiting the present invention.

Details of components used in the following Example and Comparative Examples are as follows:

(A) Polyester Resin

PCT polyester (PURATAN™ 0302, SK Chemical, melting point: 290° C.) is used.

(B1) Inorganic Filler 1

Glass fibers (A, KCC. Co., Ltd.) subjected to surface treatment with siloxane and vinyl silane compounds are used.

(B2) Inorganic Filler 2

Glass fibers (CS-A, KCC. Co., Ltd.) subjected to surface treatment with a siloxane compound are used.

(B3) Inorganic Filler 3

Glass fibers (CS-B, KCC. Co., Ltd.) subjected to surface treatment with siloxane and aminosilane compounds are used.

(B4) Inorganic Filler 4

Glass fibers (910, Owens Corning Co., Ltd.) subjected to surface treatment with an epoxy compound are used.

(C1) White Pigment 1

Titanium oxide ($TiO_2$) (2233, KRONOS Co., Ltd. (USA)) subjected to surface treatment with a silicone compound is used.

(C2) White Pigment 2

Titanium oxide ($TiO_2$) (R105, DuPont Co., Ltd. (USA)) subjected to surface treatment with a silicone compound is used.

Example 1

A thermoplastic resin composition is prepared by dry blending the polyester resin, the glass fibers, and the white pigment in amounts as listed in Table 1. Then, the thermoplastic resin composition is subjected to extrusion at a nozzle temperature of 250° C. to 350° C. using a twin screw extruder (Φ=450 mm), thereby preparing pellets. The prepared pellets are dried at 100° C. for 4 hours or more, followed by injection molding, thereby preparing a specimen. The prepared specimen is evaluated as to the following properties, and results are shown in Table 1.

Example 2

Preparation of a specimen and testing are performed in the same manner as in Example 1 except that the inorganic fillers 2 (B2) are used instead of the inorganic fillers 1 (B1).

Example 3

Preparation of a specimen and testing are performed in the same manner as in Example 1 except that the inorganic fillers 3 (B3) are used instead of the inorganic fillers 1 (B1).

Example 4

Preparation of a specimen and testing are performed in the same manner as in Example 1 except that the white pigment 2 (C2) is used instead of the white pigment (C1).

Comparative Example 1

Preparation of a specimen and testing are performed in the same manner as in Example 1 except that the inorganic fillers 4 (B4) are used instead of the inorganic fillers 1 (B1).

Based on the measured values, a difference in reflectance is calculated according to Equation 1:

$$\text{Difference in reflectance (\%)} = |(F1-F0)|$$

where F0 is initial reflectance of the molded article and F1 is reflectance measured after the molded article is irradiated with light at a wavelength of 450 nm in a constant temperature/humidity oven at 170° C. and 85% RH for 480 hours.

(2) Yellow Index (YI)

Yellow index is measured on a 2.5 mm thick specimen using a color difference meter (Minolta 3600D CIE Lab.) in accordance with ASTM D1925. Specifically, after measuring initial yellow index of the specimen, yellow index is measured on the specimen after the specimen is subjected to light irradiation (LED light source, wavelength of 460 nm) in a constant temperature/humidity oven at 170° C. and 85% RH for 140 hours, 220 hours, and 480 hours, thereby calculating variation in yellow index. Based on the measured values, a difference in yellow index is calculated according to Equation 2:

$$\text{Difference in yellow index (\%)} = |(YI1-YI0)|$$

where YI0 is initial yellow index of the molded article and YI1 is yellow index after the molded article is subjected to light irradiation in a constant temperature/humidity m oven at 170° C. for 480 hours.

TABLE 1

| Item | | Example 1 | Example 2 | Example 3 | Example 4 | Comparative Example 1 |
|---|---|---|---|---|---|---|
| (A) | Polyester | 60 | 60 | 60 | 60 | 60 |
| (B1) | Inorganic fillers 1 | 20 | — | — | 20 | — |
| (B2) | Inorganic fillers 2 | — | 20 | — | — | — |
| (B3) | Inorganic fillers 3 | — | — | 20 | — | — |
| (B4) | Inorganic fillers 4 | — | — | — | — | 20 |
| (C1) | White pigment 1 | 20 | 20 | 20 | — | 20 |
| (C2) | White pigment 2 | — | — | — | 20 | — |
| Amount of Si in resin composition | | 0.48 | 0.48 | 0.50 | 0.70 | 0.20 |
| Result of reflectance evaluation for specimen (450 nm) | Initial reflectance | 100 | 100 | 100 | 100 | 100 |
| | 140 hr | 98.1 | 97.3 | 97.4 | 97.9 | 96.6 |
| | 220 hr | 97.4 | 96.7 | 96.8 | 97.3 | 95.7 |
| | 480 hr | 93.6 | 93.5 | 93.3 | 93.4 | 92.2 |
| | $|(F1 - F0)|$ | 6.4 | 6.5 | 6.7 | 6.6 | 7.8 |
| Result of yellow index evaluation for specimen (170° C.) | Initial yellow index | 4.1 | 3.9 | 4.0 | 4.0 | 4.0 |
| | 140 hr | 6.0 | 5.7 | 5.9 | 5.8 | 6.3 |
| | 220 hr | 6.4 | 6.2 | 6.3 | 6.3 | 6.9 |
| | 480 hr | 8.6 | 8.3 | 8.6 | 8.4 | 9.2 |
| | $|(YI1 - YI0)|$ | 4.5 | 4.4 | 4.6 | 4.4 | 5.2 |

<Property Evaluation>

(1) Reflectance

Reflectance at a wavelength of 450 nm is measured on each of the plate type specimens prepared in the Examples and Comparative Examples. As a reflectometer, 3600 CIE Lab (KONICA MINOLTA HOLDINGS, INC.) is used.

Specifically, after measuring initial reflectance (specular component included (SCI) mode) of the specimen, reflectance is measured on the specimen after the specimen is subjected to light irradiation in a constant temperature/humidity oven at 170° C. and 85% RH for 140 hours, 220 hours, and 480 hours, thereby calculating a decrement (difference) in reflectance.

As shown in Table 1, it can be seen that the specimens of Examples 1 to 4 according to the present invention exhibit excellent reflectance maintenance and yellow index after 480 hours as compared with that of Comparative Example 1. Specifically, reflectance of the specimens of Examples 1 to 4 is maintained at 93.3% or higher, whereas reflectance of the specimen of Comparative Example 1 is reduced to 92.2%. In addition, the specimens of Examples exhibit a yellow index of up to 8.3, whereas the specimen of Comparative Example 1 exhibits a yellow index of 9.2. Thus, the specimens of Examples and Comparative Example are significantly different in terms of yellow index. From these results, it is ascertained that the thermoplastic resin composition according to the present invention, including glass fibers subjected to surface treatment with a silicone compound, improves compatibility between components of the composition, thereby improving properties, whereas the molded article manufactured using the thermoplastic resin composition including glass fibers not subjected to surface treatment with a silicone compound exhibits poor reflectance maintenance and yellow index. From this, it can be seen that the molded article manufactured using the thermoplastic resin composition according to the present invention can have high reflectance while exhibiting excellent photostability and discoloration resistance.

Although some embodiments have been described herein, it should be understood that these embodiments are provided for illustration only and are not to be construed in any way as limiting the present invention, and that various modifications, changes, alterations, and equivalent embodiments can be made by those skilled in the art without departing from the spirit and scope of the invention. Therefore, the scope of the present invention should be defined by the appended claims and equivalents thereof.

LIST OF REFERENCE NUMERALS

1: Reflector or housing
2: Electrode or package
3: Substrate
4: Sealing resin or empty surface
5: Wire or lead
6: Photovoltaic device (LED)

What is claimed is:

1. A thermoplastic resin composition comprising:
(A) about 50 wt % to about 80 wt % of a polyester resin, wherein the polyester resin (A) includes a unit represented by Formula 1:

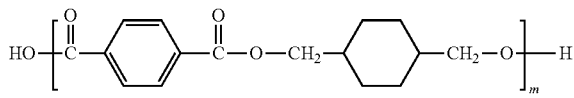

where m is an integer from 10 to 500,
(B) about 5 wt % to about 30 wt % of inorganic fillers, wherein the inorganic fillers include glass fibers, and
(C) about 5 wt % to about 30 wt % of a white pigment, wherein the white pigment includes titanium oxide, wherein both of the (B) inorganic fillers and the (C) white pigment are subjected to surface treatment with a silicone compound,
wherein the composition includes silicon in an amount of about 0.4 wt % to about 1 wt % based on the total weight of (A), (B), and (C), and
wherein a molded article manufactured using the thermoplastic resin composition has:
a difference in reflectance of less than about 8%, as given by Equation 1:

Difference in reflectance (%)=|(F1−F0)| where F0 is initial reflectance of the molded article and F1 is reflectance measured after the molded article is irradiated with light at a wavelength of 450 nm in a constant temperature/humidity oven at 170° C. and 85% RH for 480 hours; and
a difference in yellow index of about 4.6 or less, as given by Equation 2:

Difference in yellow index (%)=|(YI1−YI0)| where YI0 is initial yellow index of the molded article, and YI1 is yellow index measured after the molded article is left at 170° C. for 480 hours.

2. The thermoplastic resin composition according to claim 1, wherein the (A) polyester resin has a melting point of about 200° C. to about 380° C.

3. The thermoplastic resin composition according to claim 1, wherein the (A) polyester resin has a melting point of about 200° C. to about 300° C.

4. The thermoplastic resin composition according to claim 1, wherein the silicone compound comprises at least one compound represented by any one of Formula 2 and/or Formula 3:

wherein each $R^1$ is the same or different and each is independently a $C_1$ to $C_5$ alkoxy group, each $R^2$ is the same or different and is each independently an acrylate group, a methacrylate group, a vinyl group, a $C_1$ to $C_{10}$ alkylamino group, a cyanate group, an isocyanate group, an epoxy group, a hydroxyl group, a thiol group, a ureido group, a $C_1$ to $C_{10}$ glycidyloxyalkyl group, a $C_3$ to $C_{10}$ epoxycycloalkyl group, or a carboxyl group, and x is an integer from 1 to 3,

wherein each $R^3$ is the same or different and each is independently hydrogen, an unsubstituted $C_1$ to $C_{10}$ alkyl group, a vinyl-substituted $C_1$ to $C_{10}$ alkyl group, a $C_6$ to $C_{20}$ aryl-substituted $C_1$ to $C_{10}$ alkyl group, a vinyl group, a $C_6$ to $C_{20}$ aryl group, a $C_1$ to $C_{10}$ alkoxy group, a $C_1$ to $C_{10}$ alkyl-substituted $C_1$ to $C_{10}$ alkoxy group, a $C_1$ to $C_{10}$ alkoxy-substituted $C_7$ to $C_{20}$ alkaryl group, a halogen group, an acetoxy group, or a hydroxyl group, n ranges from 2 to 3, and m ranges from 2 to 200.

5. The thermoplastic resin composition according to claim 1, wherein the silicone compound comprises γ-(3,4-epoxycyclohexyl)ethyltrimethoxysilane, γ-glycidoxypropyltrimethoxysilane, γ-glycidoxypropylmethylethoxysilane, 2-(3,4-epoxycyclohexyl)ethyltriethoxysilane, γ-isocyanatopropyltrimethoxysilane, vinyltriethoxysilane, 2-aminopropyltriethoxysilane, polydimethylsiloxane, vinylphenylmethyl-terminated dimethylsiloxane, divinylmethyl-terminated polydimethylsiloxane, or a mixture thereof.

6. The thermoplastic resin composition according to claim 1, further comprising at least one additive selected from the group consisting of antibacterial agents, heat stabilizers, antioxidants, release agents, photostabilizers, surfactants, coupling agents, plasticizers, compatibilizers, lubricants, antistatic agents, flame retardants, flame retardant aids, anti-dripping agents, weather resistance stabilizers, UV absorbers, UV blocking agents, and mixtures thereof.

7. A molded article manufactured using the thermoplastic resin composition according to claim 1.

8. The molded article according to claim 7, wherein the molded article is a component of an illumination device including an LED as a light source, and the component is a reflector or a housing.

9. The thermoplastic resin composition according to claim 1, wherein a molded article manufactured using the thermoplastic resin composition has:
a difference in reflectance of 6.7% or less, as given by Equation 1:

Difference in reflectance (%) =|(F1-F0)| where F0 is initial reflectance of the molded article and F1 is reflectance measured after the molded article is irradiated with light at a wavelength of 450 nm in a constant temperature/humidity oven at 170° C. and 85% RH for 480 hours.

* * * * *